United States Patent
Phadke (10) Patent No.: US 10,862,398 B2
(45) Date of Patent: Dec. 8, 2020

(54) DC-DC POWER CONVERTER FOR USE IN DATA COMMUNICATIONS DISTRIBUTED POWER ARCHITECTURE

(71) Applicant: Astec International Limited, Kowloon (HK)

(72) Inventor: Vijay Gangadhar Phadke, Pasig (PH)

(73) Assignee: Astec International Limited, Kowloon (HK)

(*) Notice: Subject to any disclaimer, the term of this patent is extended or adjusted under 35 U.S.C. 154(b) by 0 days.

(21) Appl. No.: 15/011,049

(22) Filed: Jan. 29, 2016

(65) Prior Publication Data
US 2016/0226385 A1   Aug. 4, 2016

Related U.S. Application Data

(60) Provisional application No. 62/111,430, filed on Feb. 3, 2015.

(51) Int. Cl.
*H02M 1/00* (2006.01)
*H02M 3/335* (2006.01)

(52) U.S. Cl.
CPC .......... *H02M 3/335* (2013.01); *H02M 3/3353* (2013.01); *H02M 3/33538* (2013.01); *H02M 2001/007* (2013.01); *H02M 2001/008* (2013.01)

(58) Field of Classification Search
CPC .................. H02M 2001/007; H02M 2001/008
See application file for complete search history.

(56) References Cited

U.S. PATENT DOCUMENTS

| | | | |
|---|---|---|---|
| 4,654,769 A | 3/1987 | Middlebrook | |
| 5,006,782 A | 4/1991 | Pelly | |
| 5,073,848 A * | 12/1991 | Steigerwald | G05F 1/577 307/29 |
| 5,377,090 A * | 12/1994 | Steigerwald | H02M 3/33561 307/18 |
| 5,424,934 A * | 6/1995 | Tanuma | H02M 3/28 363/59 |

(Continued)

FOREIGN PATENT DOCUMENTS

| | | |
|---|---|---|
| CN | 101350554 A | 1/2009 |
| CN | 101795069 A | 8/2010 |

(Continued)

OTHER PUBLICATIONS

Taylor et al.; Phase Shifting Optimizes Multistage Buck Converters; 2007; pp. 26-31.

(Continued)

*Primary Examiner* — Jue Zhang
*Assistant Examiner* — David A. Singh (57) ABSTRACT

A dc-dc power converter is for use in data communications and for connection between a front end ac-dc power supply and a point-of-load circuit. The dc-dc power converter includes either an unregulated flyback converter or an unregulated buck converter. Each flyback and buck converter has an input for connection to an output of the front end ac-dc power supply and an output for connection to an input of the point-of-load circuit. A switch controller has an input connected to either the flyback converter input or the buck converter. The switch controller has an output connected to either a switch of the flyback converter or a switch of the buck converter.

21 Claims, 6 Drawing Sheets

(56) References Cited

U.S. PATENT DOCUMENTS

| | | | | |
|---|---|---|---|---|
| 5,892,933 | A * | 4/1999 | Voltz | G06F 13/4018 710/316 |
| 6,370,039 | B1 * | 4/2002 | Telefus | H02M 3/3376 363/131 |
| 6,807,073 | B1 * | 10/2004 | Scarlatescu | H02M 1/4225 363/34 |
| 7,000,125 | B2 * | 2/2006 | Chapuis | H02J 1/08 713/300 |
| 7,272,021 | B2 | 9/2007 | Schlecht et al. | |
| 7,394,445 | B2 * | 7/2008 | Chapuis | G06F 1/26 345/204 |
| 7,518,263 | B2 * | 4/2009 | Gan | H02M 3/33561 307/32 |
| 7,653,757 | B1 * | 1/2010 | Fernald | G06F 1/26 323/222 |
| 7,787,261 | B2 * | 8/2010 | Farrington | H02M 3/33592 363/132 |
| 7,882,372 | B2 * | 2/2011 | Chapuis | G06F 1/329 323/371 |
| 9,112,422 | B1 * | 8/2015 | Vinciarelli | H02M 3/33507 |
| 9,214,858 | B2 | 12/2015 | Holmberg et al. | |
| 9,335,774 | B1 * | 5/2016 | Sheng | G05F 1/577 |
| 9,660,537 | B1 * | 5/2017 | Vinciarelli | H02M 7/219 |
| 9,729,052 | B1 * | 8/2017 | Chakraborty | H02M 3/158 |
| 2002/0015315 | A1 * | 2/2002 | Telefus | H02M 3/3376 363/15 |
| 2003/0142513 | A1 * | 7/2003 | Vinciarelli | H02J 1/102 363/17 |
| 2004/0174147 | A1 * | 9/2004 | Vinciarelli | H02M 1/088 323/266 |
| 2005/0289373 | A1 * | 12/2005 | Chapuis | G06F 1/26 713/300 |
| 2006/0226130 | A1 * | 10/2006 | Kooken | B23K 9/1056 219/130.1 |
| 2007/0279945 | A1 * | 12/2007 | Salato | H02M 1/08 363/21.14 |
| 2008/0084197 | A1 * | 4/2008 | Williams | H02M 1/38 323/282 |
| 2011/0075458 | A1 | 3/2011 | Phadke et al. | |
| 2011/0234000 | A1 * | 9/2011 | Yan | H02M 3/157 307/31 |
| 2011/0273097 | A1 * | 11/2011 | Kuo | H05B 41/2885 315/159 |
| 2012/0066848 | A1 * | 3/2012 | Klemm | A61C 17/221 15/21.1 |
| 2012/0113687 | A1 * | 5/2012 | Wildrick | H02M 3/3378 363/21.02 |
| 2013/0089199 | A1 * | 4/2013 | Amine | H04M 1/7385 379/413 |
| 2013/0119962 | A1 * | 5/2013 | Holmberg | H02J 1/00 323/304 |
| 2013/0163287 | A1 * | 6/2013 | Pal | H02M 3/33515 363/16 |
| 2013/0335043 | A1 * | 12/2013 | He | H02M 3/04 323/234 |
| 2014/0300274 | A1 * | 10/2014 | Acatrinei | H05B 33/0815 315/85 |
| 2014/0344600 | A1 * | 11/2014 | Breen | H02M 3/1584 713/323 |

FOREIGN PATENT DOCUMENTS

| | | |
|---|---|---|
| CN | 102035407 A | 4/2011 |
| CN | 102355136 A | 2/2012 |
| CN | 102986108 A | 3/2013 |

OTHER PUBLICATIONS

Texas Instruments Schematic; 48Vin Positive 12A & Negative 100mA; 2013; 1 page.
ETA-USA Datasheet; Non-Isolated DC-DC Converter; 3 pages.
Core Technology, Inc. Datasheet; Non-Isolated Regulated DC-DC Converter Modules; pp. 5-12.

* cited by examiner

DC-DC POWER CONVERTER FOR USE IN DATA COMMUNICATIONS DISTRIBUTED POWER ARCHITECTURE

CROSS-REFERENCE TO RELATED APPLICATION

This application claims the benefit of U.S. Provisional Application No. 62/111,430 filed Feb. 3, 2015. The entire disclosure of the above application is incorporated herein by reference.

FIELD

The present disclosure relates to dc-dc power converters for use in data communications systems. More specifically, the present disclosure relates to power converters that provide a fixed gain with high efficiency step-down conversion for line cards and other applications.

BACKGROUND

This section provides background information related to the present disclosure which is not necessarily prior art.

Large telecommunication (telecom) installations traditionally use a negative or −48 volt (V) battery backup system. A negative voltage system and specifically a −48V system developed for a variety of reasons. One reason for a negative voltage system is that there is less corrosion of copper cables compared to a positive voltage system. Grounding the positive battery terminal provides cathodic protection. The output voltage level, historically, was the result of connecting four 12V batteries in series. Thus, a standard −48V telecom power distribution architecture developed. In some places −60V systems developed, i.e. from connecting five batteries together.

As data communications (datacom) developed the industry adopted the −48V legacy architecture. This is despite datacom systems generally not using battery backup and the reasons for using negative voltage are not a concern in datacom. The reasons for leveraging the −48V architecture include the wide availability and therefore relatively low cost of rectifiers and power converters designed for −48V applications. In addition, typical datacom and modern telecom networking applications have a regulated −48V bus eliminating large voltage variations of historical battery operated systems.

Figure 1:
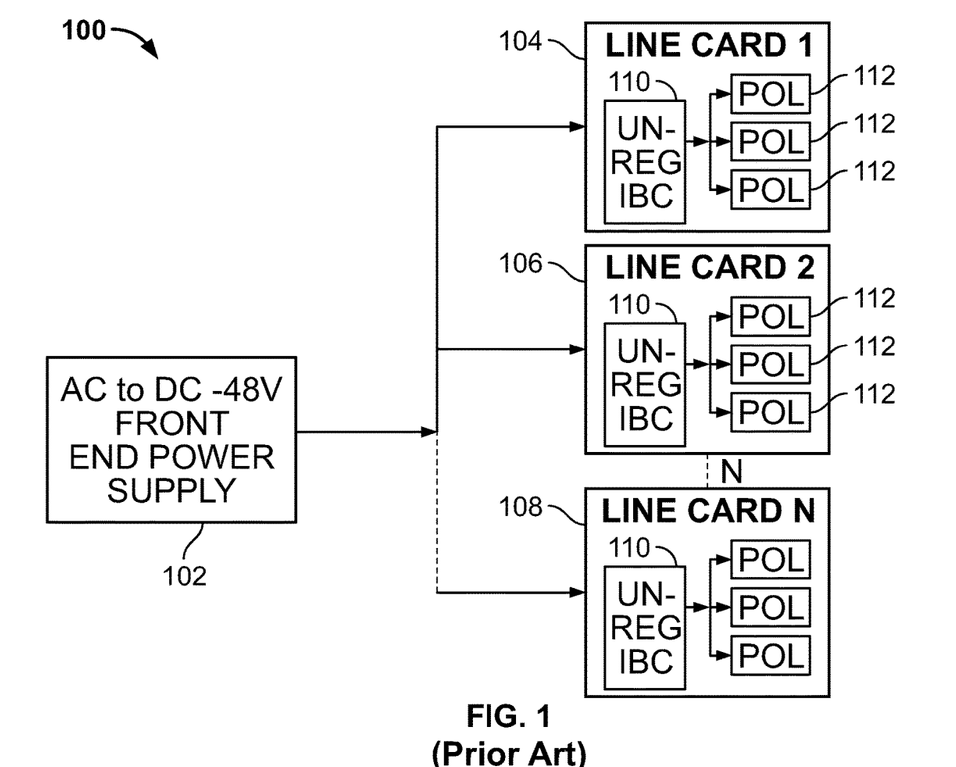
FIG. 1 is a prior art block diagram of a datacom architecture.

Datacom and modern telecom systems use fast switching digital processor operating at a variety of low voltage supply levels, e.g. from about 1V to 5V. In addition, the variety of processors and digital equipment led to complex power-up and power-down sequencing requirements. This led to a distributed architecture where a regulated −48V dc (direct current) supply was stepped down to a lower voltage, e.g. +12V. Point-of-load (POL) circuits then further stepped the +12V to the required voltage supply level. The POL circuits may include dc-dc step-down regulators, e.g. voltage regulator modules (VRM) to accommodate every increasing current slew rate requirements for the digital processors. Non-isolated POL circuit regulators are typically used because they easily and economically meet the architecture requirements, including the sequencing requirements. As system power demands increased, a distributed system 100 of providing a relatively low current −48V from ac-dc front end power supply 102 to multiple line cards 104, 106, 108 evolved, as shown in FIG. 1. Each line card typically includes an unregulated isolated step-down converter 110 connected to a plurality of POL circuits 112. This is possible because the non-isolated POL regulators can tolerate some variability in the input power signal.

Figure 2:
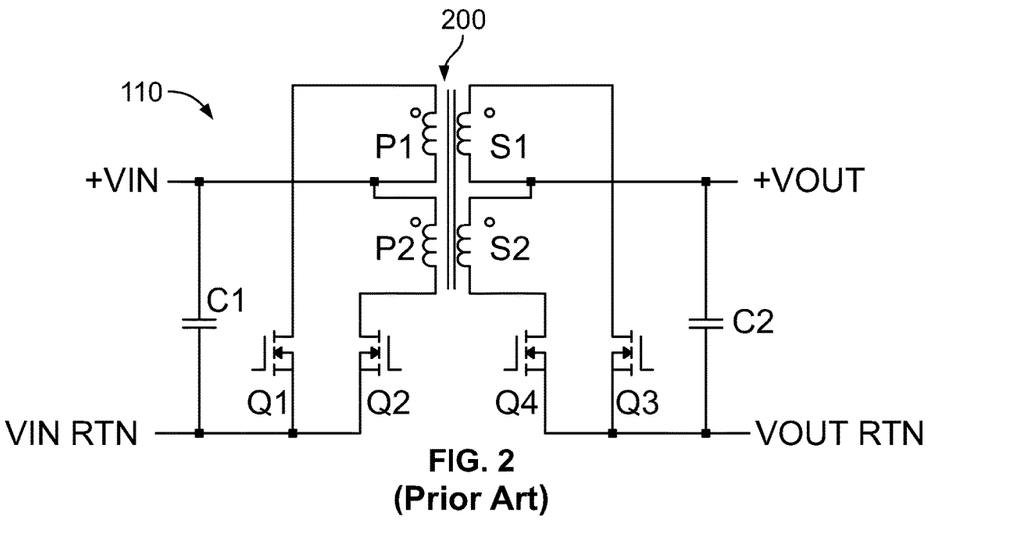
FIG. 2 is a prior art dc-dc power converter circuit.

A typical prior art unregulated converter 110 is an unregulated Intermediate Bus Converter (IBC) shown in FIG. 2. The IBC 110 generates an intermediate bus dc voltage, e.g. +12V (from a transformer 200 turns ratio of 4:1) or +10.4V (5:1 turns ratio). The IBC also provides polarity inversion and to suppress circulating common mode chassis currents. Because the −48V front end supply 102, VIN, is regulated, the IBC output, VOUT, is also sufficiently regulated, except in load transient conditions. The primary switches Q1, Q2 may be operated at approximately 50% duty cycle (D) by a switch controller (not shown), with appropriate short transition times between the switches to avoid current spikes, as is known. The synchronous rectifiers Q3, Q4 may be driven, in phase, with the primary switches Q1, Q2, in appropriate polarity. The drive signal for Q3 and Q4 may be obtained transformer 200's secondary windings creating essentially a push-pull converter. Capacitors C1, C2 are filter capacitors.

As recognized by the inventor, various parasitic inductances that are created during operation of converter 110, e.g. transformer leakage inductance, layout and component lead inductance, etc. slows rising output currents. In addition, the dead transition time between the switching transitions of Q1, Q2 causes significant ripple current stress on output capacitor C2 of about 40% of the load current. For example a 50 amp (A) rated design produces about 20 A rms (root mean square) on C2, with similar stress on C1. Accordingly, the inventor has recognized a need for an efficient dc-dc power converter with fast transient response with appropriate circulating chassis current control with or without isolation (aka galvanic isolation).

SUMMARY

This section provides a general summary of the disclosure, and is not a comprehensive disclosure of its full scope or all of its features.

A dc-dc power converter example is disclosed for use in data communications and telecommunications networks. The power converter is for connection between a front end ac-dc power supply and a point-of-load circuit. The dc-dc power converter may include one of an unregulated flyback converter and an unregulated buck converter. Each of the flyback and the buck converters has an input for connection to an output of the front end ac-dc power supply and an output for connection to an input of the point-of-load circuit. A switch controller has an input connected to either the flyback converter input or the buck converter input. The switch controller has an output connected to one of a switch of the flyback converter and a switch of the buck converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 3:
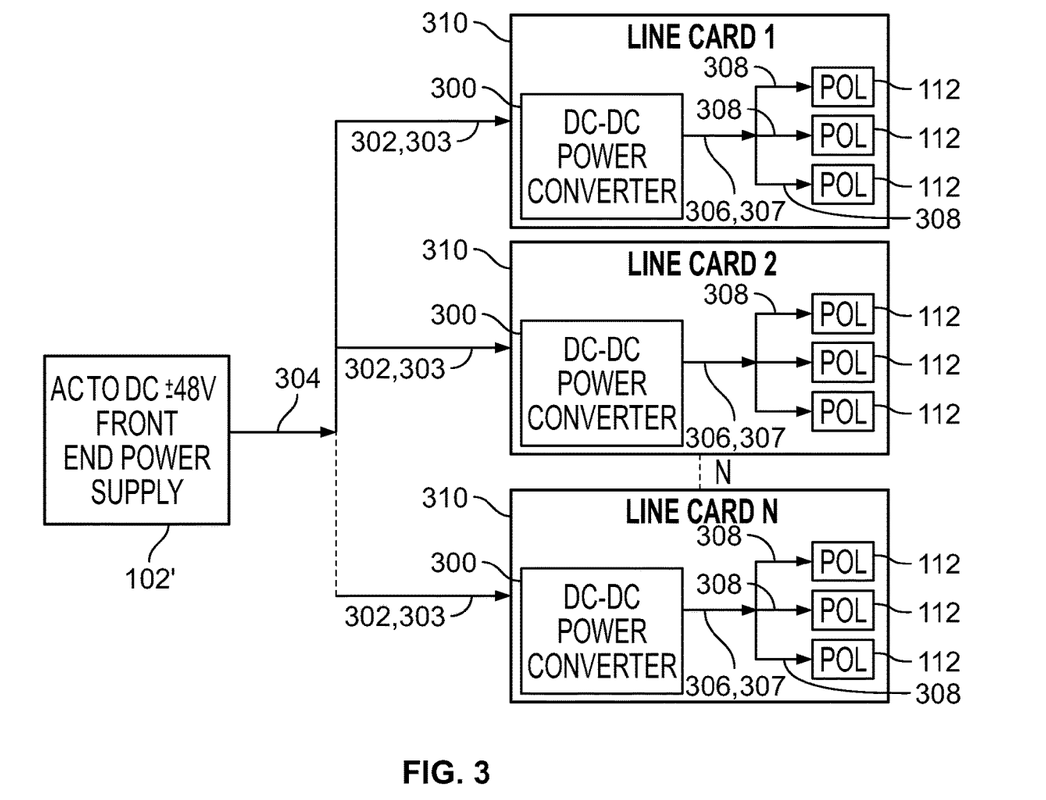
FIG. 3 is block diagram of a datacom architecture incorporating disclosed example dc-dc power converters.

A dc-dc power converter 300 for use in data communications and telecom networks is described. The power converter 300 is for connection between a front end ac-dc power supply 102' and a point-of-load circuit (POL) 112, as shown in FIG. 3.

Figure 4:
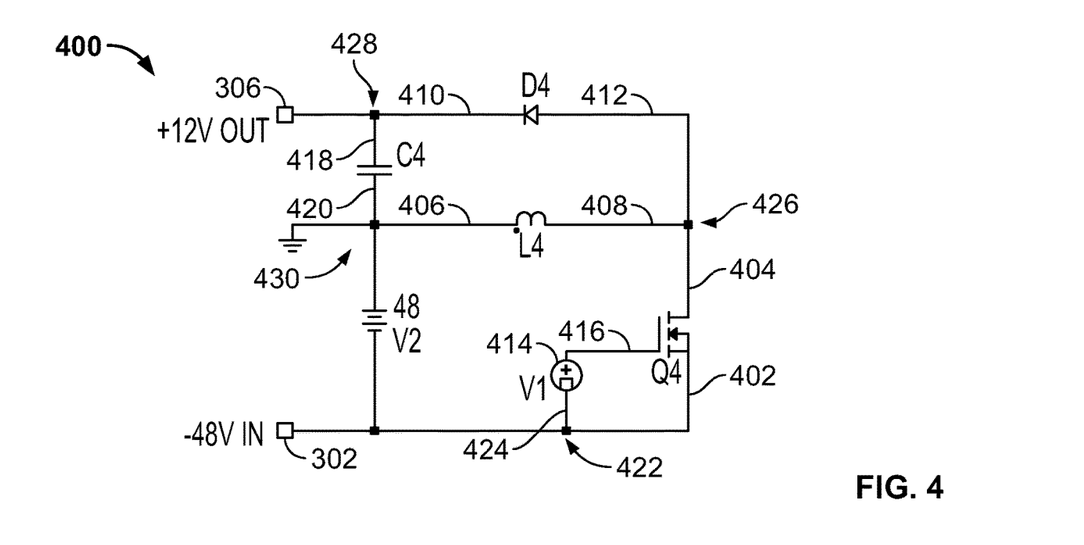
FIG. 4 is a single phase example dc-dc power converter.
Figure 5:
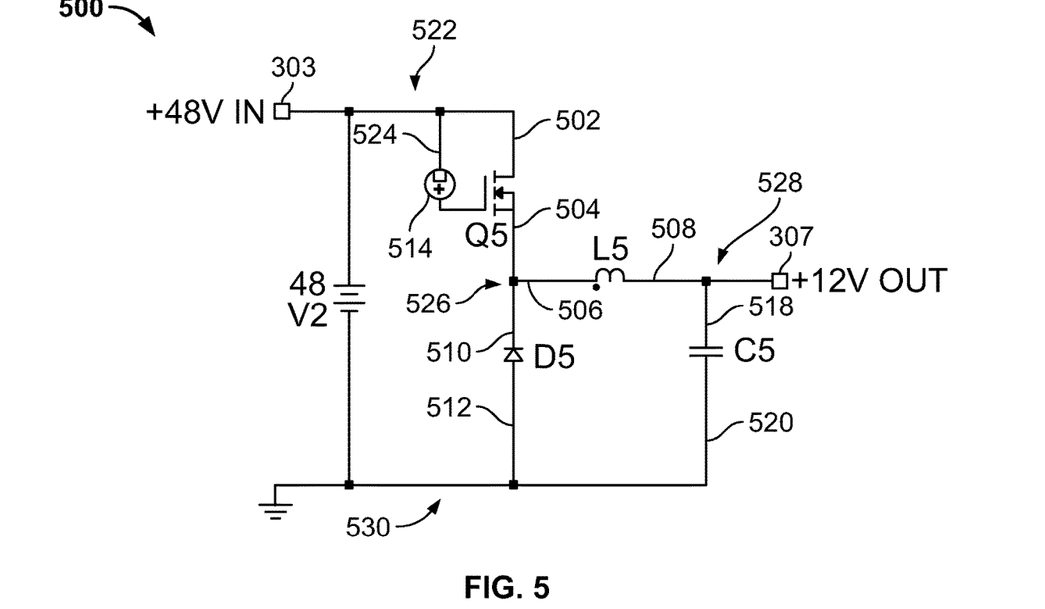
FIG. 5 is another single phase example dc-dc power converter.

The dc-dc power converter 300 may include one of an unregulated flyback converter 400 (shown in FIG. 4) and an unregulated buck converter 500 (shown in FIG. 5). Referring to FIG. 3, each of the flyback and the buck converters 400, 500 has an input 302, 303 for connection to an output 304 of the front end ac-dc power supply 102' and an output 306, 307 for connection to an input 308 of the point-of-load circuit 112. The front end ac-dc power supply 102' is similar to the prior art supply 102 but may be a negative or a positive voltage supply as described below. A switch controller (described and shown below) has an input connected to one of the flyback converter input 302 and the buck converter input 303. The switch controller has an output connected to one of a switch of the flyback converter 400 and a switch of the buck converter 500. The dc-dc power converter 300 and the point-of-load circuit 112 may each form a part of a line card 310, as shown.

If a polarity inversion is required due to a negative power supply from front end power supply 102' and a non-isolated converter is permitted, an example flyback converter 400 may include the input 302 for connection to the output 304 of the front end ac-dc power supply 102' and the output 306 for connection to the input 308 of the POL 112.

As shown in FIG. 4, a switch Q4 has a first and a second connector 402, 404; an inductor L4 has a first and a second connector 406, 408; and a diode D4 has a first and a second connector 410, 412. A switch controller 414 has an output 416 connected to the switch Q4 for opening and closing the switch Q4 to provide a pulsed signal from the front end ac-dc power supply 102' to the inductor L4 and the diode D4. An output capacitor C4 has a first and a second connector 418, 420. A first converter node, shown generally at 422, is formed by the dc-dc input 302, the first switch connector 402, and an input 424 of the switch controller 414. A second converter node, shown generally at 426, is formed by the second switch connector 404, the second inductor connector 408, and the second diode connector 412. An output node, shown generally at 428 is formed by the first diode connector 410 and the first capacitor connector 418. A ground node, shown generally at 430, is formed by the first inductor connector 406 and the second capacitor connector 420.

By appropriately driving the switch Q4 with the switch controller 414, a desired +12V output may be achieved from a −48V input. The inductor L4 stores energy when the switch Q4 is on and discharges it to the load, at the output 306. When the switch Q4 is off, energy is stored in the output capacitor C4. Using the well-known inductor voltage balance principal where the ratio of the output voltage to the input voltage is equal to the ratio of the switch Q4 on-time to the switch Q4 off-time per cycle, the duty cycle of the switch Q4 will be 20%, with the inductor L4 discharge duty cycle of 80%. The flyback converter 400 should work well at lower powers such as 80-120 Watts (W) and provide excellent power conversion efficiency, e.g. up to about 98%.

If a positive front end power supply 102' is permitted, an example buck converter 500 may include input 303 for connection to output 304 of the front end ac-dc power supply 102' and output 307 for connection to input 308 of the POL 112.

As shown in FIG. 5 a switch Q5 has a first and a second connector 502, 504; an inductor L5 has a first and a second connector 506, 508; and a diode D5 has a first and a second connector 510, 512. A switch controller 514 has an output 516 connected to the switch Q5 for opening and closing the switch Q5 to provide a pulsed signal from the front end ac-dc power supply 102' to the inductor L5 and the diode D5. An output capacitor C5 has a first and a second connector 518, 520. A first converter node, shown generally at 522, is formed by the dc-dc input 303, the first switch connector 502, and an input 524 of the switch controller 514. A second converter node, shown generally at 526, is formed by the second switch connector 504, the first inductor connector 506, and the first diode connector 510. An output node, shown generally at 528, is formed by the second inductor connector 508 and the first capacitor connector 518. A ground node, shown generally at 530, is formed by the second diode connector 512 and the second capacitor connector 520.

By appropriately driving the switch Q5 with the switch controller 514, a desired +12V output may be achieved from a +48V input. The buck converter 500 provides the necessary step down function. Since regulation is not needed, the duty cycle of the signal driving the switch Q5 may be fixed to achieve desired step down ratio. A duty cycle of 25% will result in the 12V output, where the duty cycle is equal to the ratio of the output voltage to the input voltage (12V:48V). However, the large off-time of 75% may require a large inductor L5 and output capacitor C5, negatively impacting cost and a power density of the converter 500.

Each of the flyback converter switch Q4 and the buck converter switch Q5 may be a MOSFET (metal-oxide semiconductor field-effect transistor).

Each of the flyback converter 400 and the buck converter 500 may be non-isolated converters, if galvanic isolation is not required.

Figure 6:
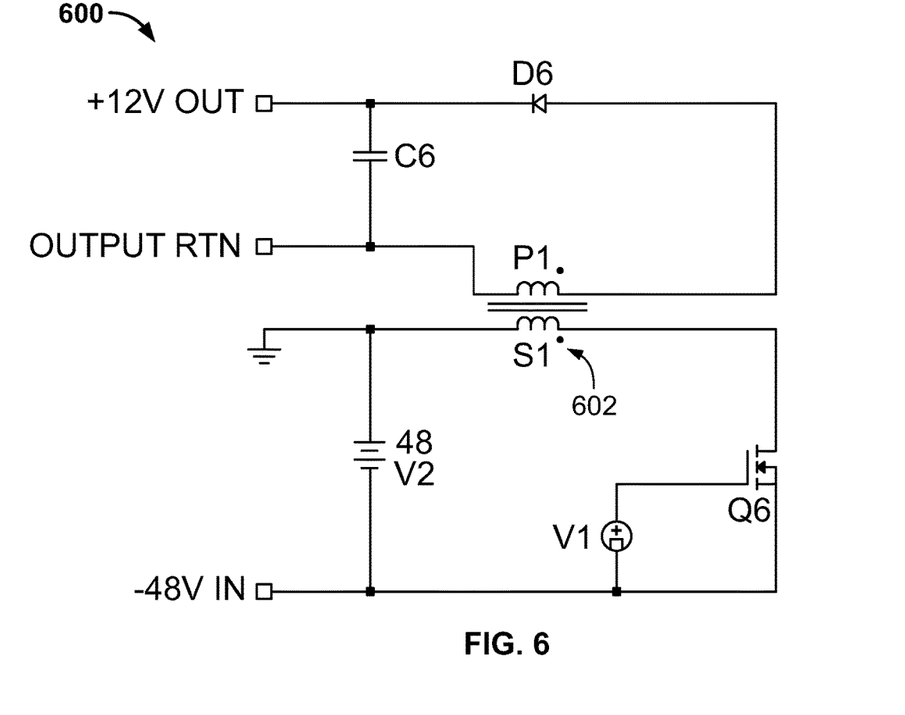
FIG. 6 is yet another single phase example dc-dc power converter.

If galvanic isolation is required a flyback converter 600 may be used, as shown in FIG. 6. The performance and structure of the flyback converter 600 is similar to the flyback converter 400 except that the inductor L5 is replaced with a transformer 602 to provide isolation. The transformer 602 may have a primary to secondary winding ratio of 1:1, aka an isolation transformer, to minimize any leakage inductance from the transformer 602. The power conversion efficiency is still high, e.g. up to 97%, though not as high as the flyback converter 400.

If higher output power levels are required, e.g. above 150 W, ripple current stresses on the output capacitor C4 or C5 will significantly increase because of the increasing charge and discharge levels during every switching cycle. Therefore, as the output power levels increase the size of the output capacitor C4 or C5 increases, negatively affecting cost and the power density.

Figure 7:
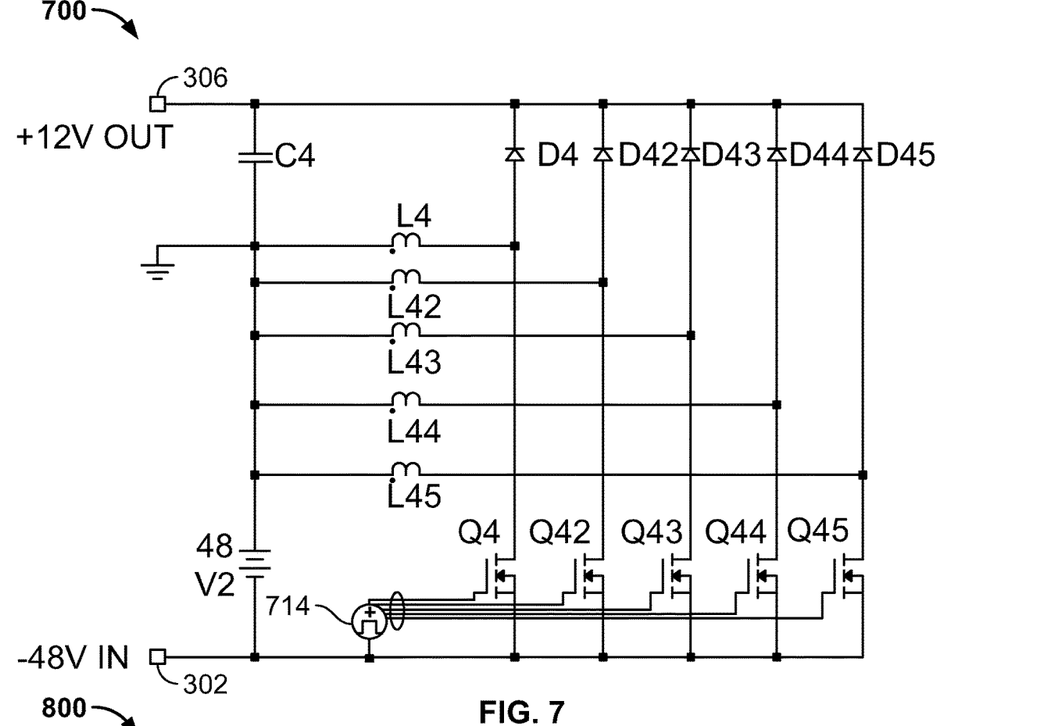
FIG. 7 is a multiple phase example dc-dc power converter.
Figure 8:
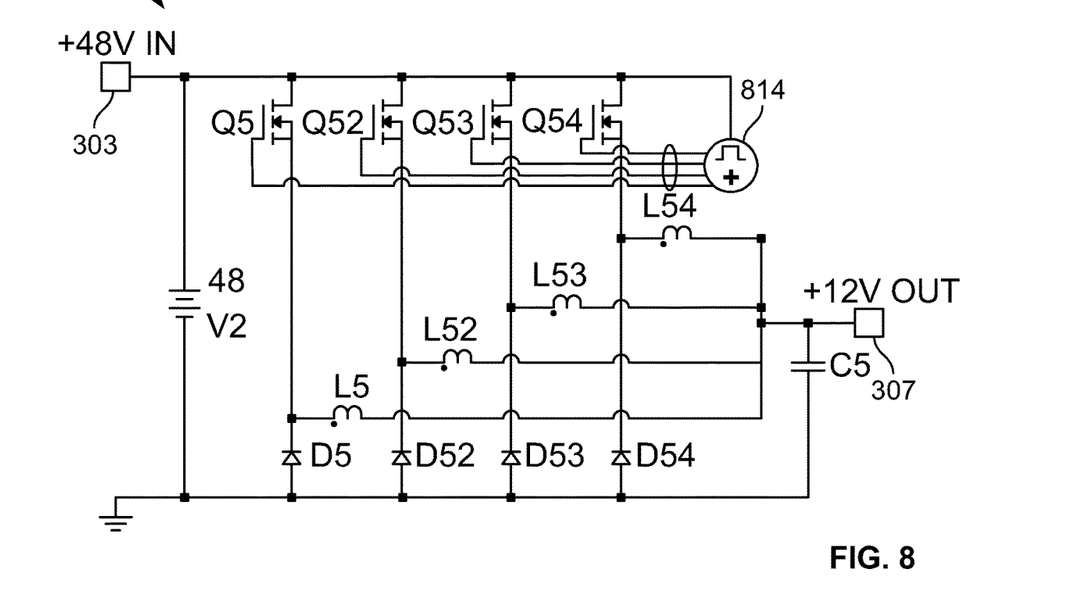
FIG. 8 is another multiple phase example dc-dc power converter.

As output power level requirements rise, the ripple stresses on the output capacitors C4, C5 also significantly rise, hindering efficiency and power density. To increase efficiency and the achievable power density for high output power levels, e.g. up to 3-4 times compared to a single phase approach, a flyback converter 700 or a buck converter 800 may include one of multiple interleaved flyback power rails and multiple interleaved buck power rails, respectively, as shown in FIGS. 7 and 8. A switch controller 714 or 814 similar to switch controllers 414 and 514, respectively, phase shifts by an equal amount the control of each switch (Q4, Q42-Q45 or Q5, Q52-Q54) of each flyback power rail and buck power rail. Each flyback power rail is formed by a switch Q4, Q42-Q45, a diode D4, D42-D45, and an inductor L L4, L42-L45, respectively.

If the front end ac-dc power supply 102' outputs a negative voltage, the dc-dc power converter 300 may include the flyback converter 700 for providing an inverted, positive voltage at the flyback converter output 306.

If the front end ac-dc power supply 102' is permitted to output a positive voltage, the dc-dc power converter 300 may include the buck converter 800.

In the example of FIG. 7, all the power switches Q4, Q42-Q45 or Q5, Q52-Q54 of the five power rails are operated at a 20% duty cycle and a 72° phase shift. Because of the several interleaved power rails, the inductors have excellent ripple current cancellation, leading to low ripple current stress on the output capacitor C4. In fact, in spite of using flyback or boost topology, the ripple current stress in the output capacitor C4 is much less compared to the prior art push-pull IBC. Depending on design goals any number of phases and the extent of interleaving may be used. For example, interleaving of three identical power rails results in driving each power rail switch at a 120° phase shift between each power rail. With fewer interleaved power rails, the ripple current in the output capacitor C4 will be higher compared to the five power rail example of FIG. 7, but still less than the prior art IBC.

In the examples of FIG. 7, the diodes are used for freewheeling operation and design requirements may require the diodes be rated for 75V or more breakdown voltage. As the voltage is stepped down from 48V to 12V, the current will increase significantly, at constant power, and losses in diodes will impact the efficiency and create thermal management challenges.

Figure 9:
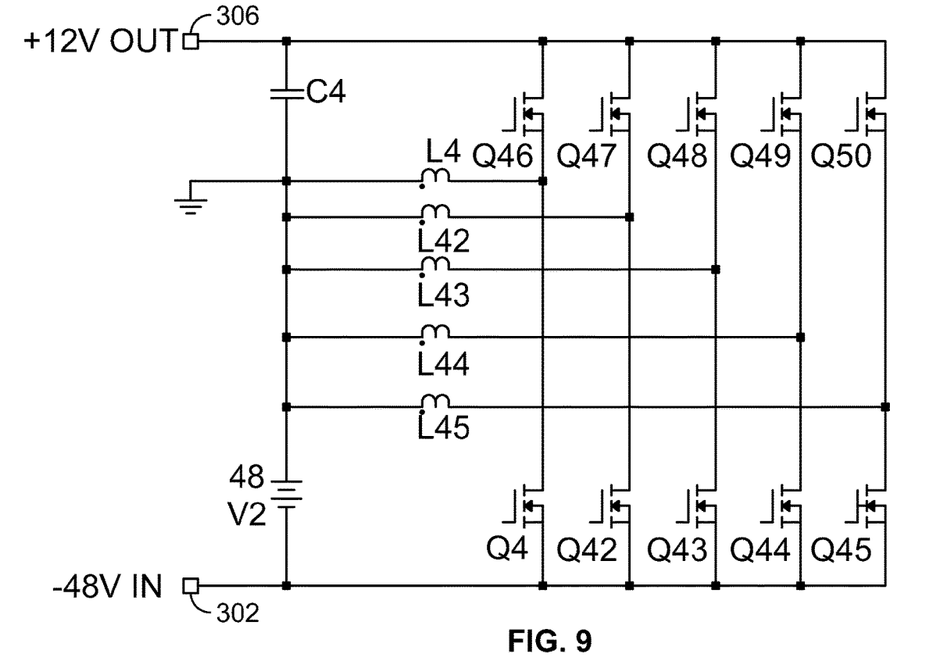
FIG. 9 is yet another multiple phase example dc-dc power converter.

The efficiency of the FIG. 7 example may be improved and thermal build-up mitigated by substituting synchronous rectifier MOSFETS for the diodes, as shown in FIG. 9. The control requirements of synchronous rectifiers are well known and therefore no controller is shown and no discussion of an example control scheme is disclosed.

Figure 10:
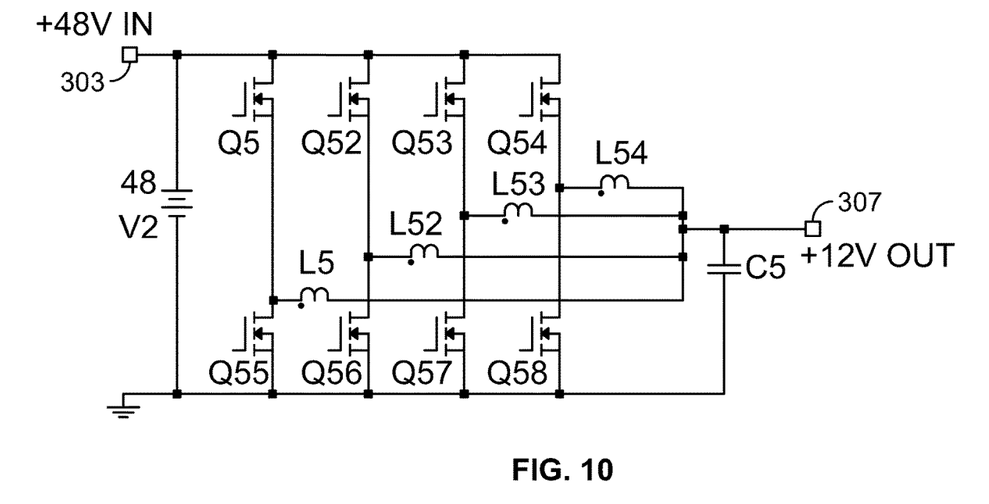
FIG. 10 is still another multiple phase example dc-dc power converter.

The buck converter example of FIG. 8, experiences losses in the freewheeling diodes that degrade efficiency and create thermal management problems. The efficiency of the FIG. 8 example may be improved by 4-5% and the thermal problems mitigated by substituting synchronous rectifier MOSFETS for the diodes, as shown in FIG. 10. As with the FIG. 9 example, FIG. 10 does not show a controller for the synchronous rectifiers and no example control scheme is disclosed.

The same factors for the FIGS. 7 and 8 examples apply to the single phase examples of FIGS. 4 and 5 where each of the flyback converter and the buck converter includes a synchronous rectifier MOSFET for controlling a current flow through an inductor.

An example operation of FIG. 9 follows. The switches Q4, Q42-Q45 are the control switches and function essentially the same as in FIG. 7, including control by switch controller (not shown). Synchronous rectifiers Q46-Q50 have replaced the diodes of the FIG. 7 example. Again because control of synchronous rectifiers is well known no switch controller is shown.

Because of the excellent ripple cancellation achieved through interleaving, the output capacitor C4 may be small. However, the energy source in this example converter is inductive; possibly unacceptably limiting a response time to fast transient load changes. To achieve a faster response time a larger capacitor may be required.

In addition, some 48V datacom applications require that the dc-dc converter to handle an input voltage change of ±10% or a range 43V to 53V. Therefore, design specifications may require use of 75V or 80V MOSFETS for the control switches and synchronous rectifier devices. Telecom applications input voltage variability may be even wider, e.g. up to 72V, requiring use of 100V control switches and synchronous rectifier devices. These higher voltage MOSFET devices have relatively slow body diodes causing unacceptable reverse recovery losses at each control switch turn-on and this conduction of the body diode of the synchronous rectifier MOSFET cannot be avoided. These losses may unacceptably deteriorate efficiency at higher switching frequencies, e.g. above 100 kHz.

It is known that the above issues may be significantly mitigated via soft switching or discontinuous current mode (DCM) operation. However, soft switching circuits add to the complexity and cost and DCM operation may produce unacceptably high peak currents. Boundary mode conduction (BCM) also addresses this issue but also adds complexity, cost, and may result in unacceptably large operating frequency variation. In addition, implementing multi-phase operation in BCM is complicated. However, these loss issues may be addressed by the FIGS. 9 and 10 examples through a full range Continuous Current Mode (CCM) operation by deliberately allowing reverse current in the output inductor over the entire load current range using an inductor design or inductor choice, as explained below.

In switching applications, a net average voltage across the inductors is zero over a full cycle, i.e. the volt·second product across each inductor is balanced. The concept is explained in detail below using an example of a single phase of FIG. 9 using the switches Q4, the synchronous rectifier Q46, and the inductor L4. The concept and explanation extends to multi-phase interleaved operation of FIG. 9 and further to a great extent extends to single and multi-phase operation of FIG. 10.

In FIG. 9, when the switch Q4 turns on, the inductor L4 starts charging and storing energy. When the switch Q4 turns off, the inductor L4 discharges its energy into the load at the output 306 and replenishes any charge lost by the capacitor C4 while the switch Q4 was on. The energy available to charge the capacitor C4 is the total stored energy in the inductor L4 less the energy consumed by the load. If the operating frequency driving the switch Q4 and the inductance value of the inductor L4 are such that the energy stored in the inductor L4 every switching cycle is exactly equal to the load requirement, boundary mode operation results. In other words, the inductor L4 is fully discharged over the exact off-time of the switch Q4 and no energy is available to charge the capacitor C4. In contrast, if the inductor L4 stored energy is higher than the load needs, a surplus of energy is transferred to the capacitor C4 and output voltage at the output 306 rises slightly.

In the next cycle, because of the higher output voltage, the inductor L4 discharges earlier to maintain the volt·second balance. If the synchronous rectifier Q46 is closed during the entire off-time of the switch Q4, the inductor L4 current reverses and the inductor L4 charges in a reverse direction by drawing energy from the capacitor C4. Thus, when the inductor L4 discharges during the off-time of the switch Q4, the current flows from a source of the synchronous rectifier Q46 to a drain of the switch Q2, as in a rectifier diode. Once the inductor L4 completely discharges, the inductor L4 current again reverses and now flows from drain to a source of the switch Q4. When current flows from a drain of the synchronous rectifier Q46 to the source of the synchronous rectifier Q46, the synchronous rectifier Q46 operates as a switch, rather than a rectifier. When the synchronous rectifier Q46 turns off and just before a next activation of the switch Q4, the stored energy in the inductor L4 is returned to the energy input source at the input 302, because of the current reversal. The coordination of the controls driving the switch Q4 and the synchronous rectifier Q46 are timed so that the body diode of the switch Q4 conducts. When the switch Q4 is turned on, the switch Q4 initially operates as synchronous rectifier as current flows from the source of the switch Q4 to the drain of the switch Q4 until all of the stored energy in the inductor L4 is transferred to the input source at the input 302. After the inductor L4 has discharged, the inductor current again reverses and the inductor L4 starts to charge and store energy from the input source at the input 302 through the switch Q4.

During CCM operation, the following energy balance equation is well known:

$$V_{in} * T_{Q4on} = V_{out} * T_{Q46on} \quad (1)$$

Where $V_{in}$ is the input voltage at the input 302, $T_{Q4on}$ is the switch Q4 on-time, $V_{out}$ is the output voltage at the output 306, and $T_{Q46on}$ is the synchronous rectifier Q46 on-time.

If $T_{Q4on}$=0.20 s, $T_{Q46on}$=0.8 s, and $V_{in}$=48, then $V_{out}$=12V. Thus, the example operation ensures an output voltage of 12V regardless of load, because the inductor L4 is forced to operate in CCM. Designing the inductance value of the inductor L4 and switching operating frequency such that inductor's peak current is slightly more than twice the required load current, e.g. around 10% more ensures there is excess energy in the inductor L4 and that the above described operation occurs over the entire load range; if the switch Q4 is operated at a duty cycle D then the synchronous rectifier Q46 is operated in a complementary manner, at a duty cycle of (1-D), i.e. out of phase with respect to the synchronous rectifier Q46. To prevent unacceptable current spikes, it is known that a short transition delay (dead time) between the transition of the switch Q4 and the transition of the synchronous rectifier Q46 is desired.

If the load current from a 12V output is 10 A, then for boundary mode operation, the peak (also referred to as peak-to-peak) inductor current will be 10 A÷0.5÷0.8=25 A, as is well-known based on triangular waveforms. The inductor L4 is exactly discharged and no reverse current will follow through the inductor L4, during the switch Q4 off-time. However, if the operating frequency and inductor's value are chosen such that the peak current is 27 A, then a −2 A reverse current will build in the inductor L4 and the synchronous rectifier Q46. When the synchronous rectifier Q46 turns off, the synchronous rectifier's drain voltage rises as the stored energy from the reverse current transfers to the input source at the input 302. In addition, during the synchronous rectifier off-time, the body diode of the synchronous rectifier Q46 recovers in lossless manner. Of course, during transition, the body diode of the switch Q4 conducts because of the reverse current direction; but the switch Q4 also recovers in a lossless manner when the switch Q4 turns off, because of the resonant action of the inductor L4. It is well known to keep a transition time between switching of the switch Q4 and the synchronous rectifier Q46 small, to minimize body diode conduction losses and such should be applied to this example.

From the above explanation, a dc-dc converter using synchronous rectifiers, whether single or multiple phase, may benefit from a design where a peak current of the inductor is slightly more than twice a load current for allowing a reverse current flow in the inductor. Such a design has higher power conversion efficiency at higher switching operating frequencies compared to other designs. Depending on the application and devices chosen, a peak current that is "slightly more", may be a peak current twice the load current plus about ten percent of twice the load current. Of course, other values may also be considered "slightly more", depending on the specifications and performance demands expected for an intended application.

Regarding the buck converter examples of FIGS. 8, and 10, for some applications, it may be possible to eliminate output capacitor C5 using the step-down multiphase converters disclosed. In some applications, significant distributed capacitance on the output 307 or at the POL inputs 308 is common; and if used effectively by known techniques, an output capacitor is not needed. Eliminating the output capacitor may significantly reduce the converter cost, reduce the converter form-factor, and improve the converter's power density.

The example of FIG. 10 may have inferior dynamic response times compared to the prior art isolated IBC during sudden load changes, because of the simple constant duty cycle operation. For such applications requiring better dynamic response an output capacitor may be required. Another potential drawback of FIG. 10 concerns the power losses due to higher reverse recovery energy if 75V-100V MOSFETS are required as discussed above with respect to the flyback converter examples. These two issues for the FIG. 10 example are resolved in the same way described with respect to the flyback converter example of FIG. 9.

One potential drawback of the examples disclosed with respect to FIGS. 9 and 10 and their operations is the converters' efficiencies. Losses in the switches and synchronous rectifiers and inductors are constant, because of the fixed RMS (root mean squared) current in those devices. At a no load condition, the same energy equivalent to full load is transferred to the output capacitor and returned back to the input source, causing circulation of energy. Thus, the FIGS. 9 and 10 converters have their best efficiency at full load. Using appropriate semiconductors with very low on-resistance, a high efficiency may be achieved and, if power density maximization is a primary goal, then the examples of FIGS. 9 and 10 should be acceptable. Also, problems associated with reverse recovery of the body diode of freewheeling rectifiers are resolved by the above examples, including eliminating snubbers. The cost savings of the disclose examples, in most cases, will be more than the cost of the power lost in energy recirculation.

Figure 11:
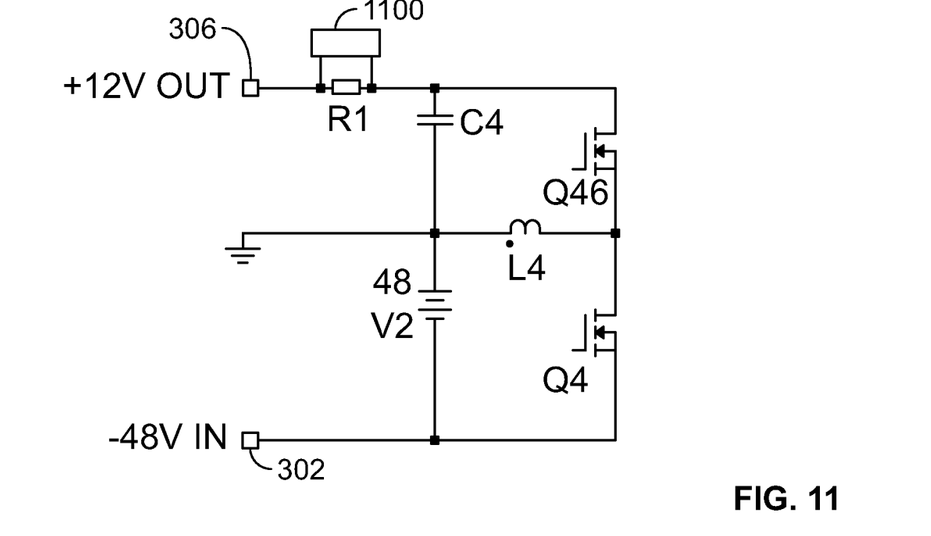
FIG. 11 is a single phase example dc-dc power converter utilizing operating frequency changes.
Figure 12:
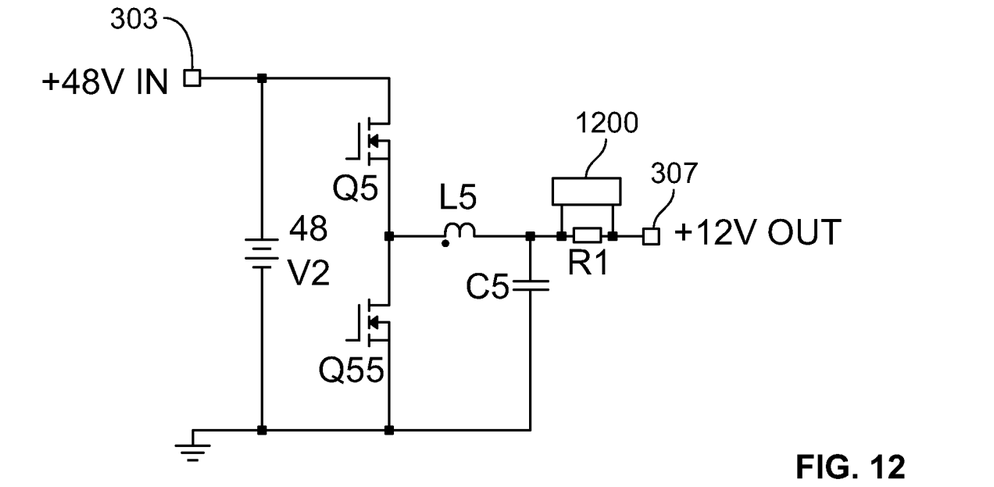
FIG. 12 is another single phase example dc-dc power converter utilizing operating frequency changes.
Figure 13:
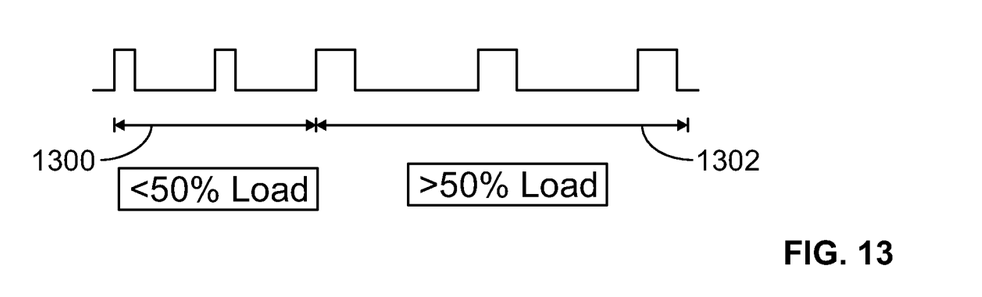
FIG. 13 is a frequency change diagram for FIG. 11 and FIG. 12.

If efficiency at lighter loads cannot be compromised, then the examples shown in FIGS. 11, 12, and 13 may be used to produce a flatter efficiency curve from no-load to full load.

In the examples of FIGS. 11 and 12, as shown in FIG. 13, each of the flyback (FIG. 11) and buck converters (FIG. 12) are operated at a fixed, constant duty cycle regardless of load and the operating frequency is varied according to load. The fixed duty cycle chosen is based on the gain or step-down ratio required between the voltage input level and the desired output level, as explained above. For this example, only a two frequency operation is described but additional frequencies operating at additional load levels may be employed. As described in detail above, the inductor values and minimum operating frequencies are selected so that the maximum peak inductor current is deliberately designed to be slightly higher than needed at full load. This ensures a reverse current and eliminates reverse recovery losses of the synchronous rectifier MOSFETS' body diodes. In the examples of each of FIGS. 11 and 12 to reduce circulating energy, the operating frequency is doubled while maintaining the same duty cycles at loads below half-load as indicated by arrow 1300 of FIG. 13. Arrow 1302 indicates the nominal operating frequency at load above 50% of full-load.

The load currents may be sensed using a sense resistance or any other type of current sensor. For example, the load current may be sensed by placing a current sense resistor, R1, in series with output 306 or 307 and determining the load current using sensors 1100 or 1200. When the load is below 50%, the frequency is doubled at the beginning of a new cycle. If the duty cycle is 20% and the operating frequency is 100 kHz at full load, doubling the operating frequency, to 200 kHz, at the same duty cycle reduces the on-time of switch Q4 or Q5 by half. The result is that only half the peak inductor current is generated compared to full load conditions while still ensuring the peak current is higher than needed to support the load and create reverse current flows through the synchronous rectifiers Q46 or Q55. The rest of the operation is the same as described above but with improved efficiency at conditions below half-load.

It is also possible to create several operating frequency change steps. For example, the switch controller may operate at 20% duty cycle at 100 kHz above 50% load, 20% duty cycle at 200 kHz between 50% and 25% load, and 20% duty cycle at 400 kHz below 25% load. Additional operating frequency steps may further improve the converters' efficiencies as the load drops. These frequency step changes are easily implemented with digital control and avoid complex control loops and stability issues. After detecting a change in a current threshold, the frequency changes should be applied at a start of a new cycle. The disclosed frequency doubling method ensures very fast transient response to load changes and reduces losses at lighter loads. When this concept is applied to multi-phase interleaved designs, a new cycle begins when the power rail operating at zero phase begins operation.

There are several ways to detect load changes and sensing the output current using current sensor is only one example. The load current may be indirectly sensed or estimated by sensing input current. Load current may also be detected by sensing a lack of body diode conduction of each control switch at the instance of turn on. As explained above, the example design ensures reverse current in the inductor to force conduction of the switch body diode. When load current increases, the inductor may enter CCM and the inductor current may not reverse. Detecting this lack of current reversal may also be used to indicate an increase in load current.

The example disclosure relative to FIGS. 11-13 provide dc-dc converters where a switching frequency at the switch controller output is increased and a duty cycle at the switch controller output is maintained as a load decreases at the output of one of the flyback converter and the buck converter. The switching frequency increase is implemented at least at one predetermined load level and possibly at multiple load levels. The switch controllers of these examples may further include at least one of a load current sensor and a load current estimator, as described.

It is also possible to drop some of the phases, of a converter having multiple interleaved power rails, at light loads, to improve efficiency and dynamic response. For example, in a converter having an N number of phases (or interleaved power rails), at light loads, the switch controller of the converter could force the converter to operate with only N-M phases, where M is smaller than N. For example, if a converter has four phases with each power rail operating at a 90° phase shift, N=4. At light loads, e.g. below 25%, two of the phases may be turned off and thus M=2 with a resultant phase shift adjustment from 90° to 180°. When the load increases above 25% of full load, all four phases may be enabled again, with a phase shift change back to 90°. This example increases the converters' dynamic frequency response without changing the operating frequency. Another way of stating this is that the converter has an N number of interleaved power rails and the switch controller, at least at one predetermined load level less than a full load, causes the converter to operate an N-M number of interleaved power rails, where M is smaller than N.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The invention claimed is:

1. A dc-dc power converter for connection between a front end ac-dc power supply and a point-of-load circuit, the dc-dc power converter comprising:
   one of an unregulated, non-isolated flyback converter and an unregulated multiphase buck converter, wherein said one of the flyback and the buck converters has an input for connection to the front end ac-dc power supply, a switch, and an output for connection to the point-of-load circuit; and
   a switch controller having an input connected to the input of said one of the flyback and the buck converters and an output connected to said switch, the switch controller configured to provide a drive signal having a switching frequency for controlling said switch based on the input of said one of the flyback and the buck converters, and change the switching frequency of the drive signal in steps.

2. The dc-dc power converter of claim 1 wherein the dc-dc power converter and the point-of-load circuit each form a part of a line card.

3. The dc-dc power converter of claim 1 wherein said switch is a metal-oxide semiconductor field-effect transistor (MOSFET).

4. The dc-dc power converter of claim 1 further comprising a synchronous rectifier MOSFET, the switch controller configured to control said switch in a complementary manner to the synchronous rectifier MOSFET.

5. The dc-dc power converter of claim 1 wherein said one of the flyback and the buck converters include an inductor arranged to allow a reverse current flow.

6. The dc-dc power converter of claim 5 wherein the switch controller is configured to increase the switching frequency of the drive signal, and maintain a duty cycle of the drive signal as a load decreases at the output of said one of the flyback and the buck converters.

7. The dc-dc power converter of claim 6 wherein the switch controller is configured to increase the switching frequency at least one predetermined load level.

8. The dc-dc power converter of claim 7 wherein the switch controller further includes at least one of a load current sensor and a load current estimator.

9. The dc-dc power converter of claim 1 wherein:
   said switch is a first switching device including a first and a second connector;
   the flyback converter includes an inductor having a first and a second connector, a second switching device having a first and a second connector, an output capacitor having a first and a second connector, a first converter node formed by an input of the dc-dc power converter, the first connector of the first switching device, and an input of the switch controller, a second converter node formed by the second connector of the first switching device, the second inductor connector, and the second connector of the second switching device, an output node formed by the first connector of the second switching device and the first capacitor connector, and a ground node formed by the first inductor connector and the second capacitor connector; and
   said output of the switch controller is connected to said first switching device for opening and closing said first switching device to provide a pulsed signal from the front end ac-dc power supply to the inductor and the second switching device.

10. The dc-dc power converter of claim 9 wherein the second switching device includes a diode or a synchronous rectifier.

11. The dc-dc power converter of claim 1 wherein:
   said switch is a first switching device including a first and a second connector;
   the buck converter includes an inductor having a first and a second connector, a second switching device having a first and a second connector, an output capacitor having a first and a second connector, a first converter node formed by an input of the dc-dc power converter, the first connector of the first switching device, and an input of the switch controller, a second converter node formed by the second connector of the first switching device, the first inductor connector, and the first connector of the second switching device, an output node formed by the second inductor connector and the first capacitor connector, and a ground node formed by the second connector of the second switching device and the second capacitor connector; and
   said output of the switch controller connected to said first switching device for opening and closing said first switching device to provide a pulsed signal from the front end ac-dc power supply to the inductor and the second switching device.

12. The dc-dc power converter of claim 11 wherein the second switching device includes a diode or a synchronous rectifier.

13. The dc-dc power converter of claim 1 wherein the switch controller is configured to maintain a constant duty cycle of the drive signal regardless of a load.

14. The dc-dc power converter of claim 1 further including one of multiple interleaved flyback power rails and multiple interleaved buck power rails.

15. The dc-dc power converter of claim 14 wherein the converter has an N number of interleaved power rails, wherein the switch controller is configured to operate an N-M number of interleaved power rails when a predetermined load level is less than a full load, and wherein M is smaller than N.

16. The dc-dc power converter of claim 1 wherein the front end ac-dc power supply is configured to output a negative voltage, wherein the dc-dc power converter includes the flyback converter, and wherein the flyback converter is configured to provide a positive voltage at the flyback converter output.

17. The dc-dc power converter of claim 1 wherein the front end ac-dc power supply is configured to output a positive voltage and wherein the dc-dc power converter includes the buck converter.

18. A distributed power system comprising a front end ac-dc power supply configured to provide a negative dc voltage, a point-of-load circuit configured to receive a positive dc voltage, an unregulated, non-isolated flyback converter having an input connected to an output of the front end ac-dc power supply, a switch, a synchronous rectifier, and an output connected to an input of the point-of-load circuit, the unregulated, non-isolated flyback converter configured to converter the negative dc voltage from the front end ac-dc power supply to the positive dc voltage for the point-of-load circuit, and a switch controller having an input connected to the flyback converter input and an output connected to the switch of the flyback converter, the switch controller configured to control the switch in a complementary manner to the synchronous rectifier.

19. The distributed power system of claim 18 wherein the synchronous rectifier is configured to achieve lossless recovery when reverse current flows in the flyback converter.

20. A distributed power system comprising a front end ac-dc power supply, a point-of-load circuit, an unregulated multiphase buck converter having an input connected to an output of the front end ac-dc power supply and an output connected to an input of the point-of-load circuit, at least one phase of the unregulated multiphase buck converter including a switch and a synchronous rectifier configured to achieve lossless recovery when reverse current flows in the buck converter, and a switch controller having an input connected to the multiphase buck converter input and an output connected to said switch, the switch controller configured to provide a drive signal having a switching frequency for controlling the switch of the multiphase buck converter based on the multiphase buck converter input, and change the switching frequency of the drive signal in steps.

21. The distributed power system of claim 20 wherein the switch controller is configured to increase the switching frequency and maintain a duty cycle of the drive signal as a load decreases at the output of the multiphase buck converter.

* * * * *

UNITED STATES PATENT AND TRADEMARK OFFICE
CERTIFICATE OF CORRECTION

PATENT NO.        : 10,862,398 B2                                                Page 1 of 1
APPLICATION NO.   : 15/011049
DATED             : December 8, 2020
INVENTOR(S)       : Vijay Gangadhar Phadke It is certified that error appears in the above-identified patent and that said Letters Patent is hereby corrected as shown below:

In the Claims

Column 13, Claim 18, Line 16, replace "converter" with --convert--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*